May 21, 1968  A. J. BRUNER  3,384,352
ANIMAL CROSSING GUARD
Filed April 11, 1966
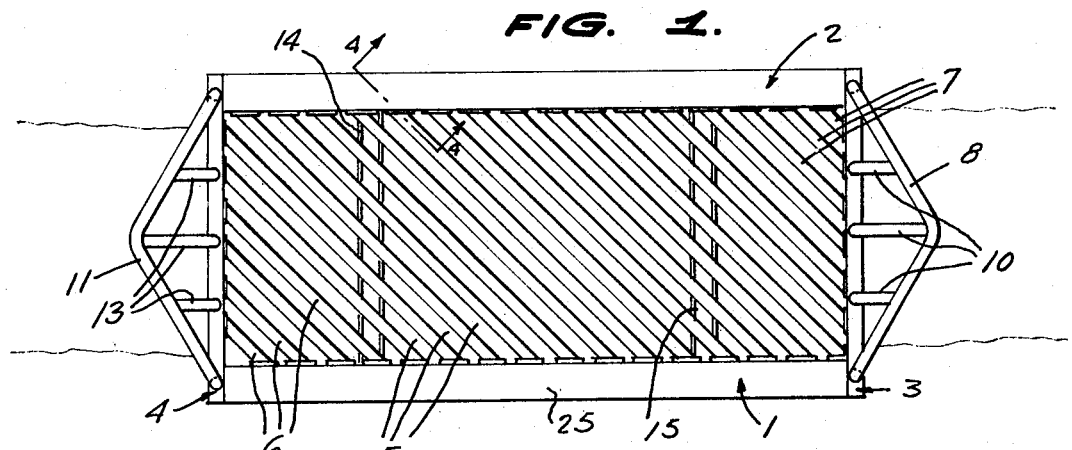
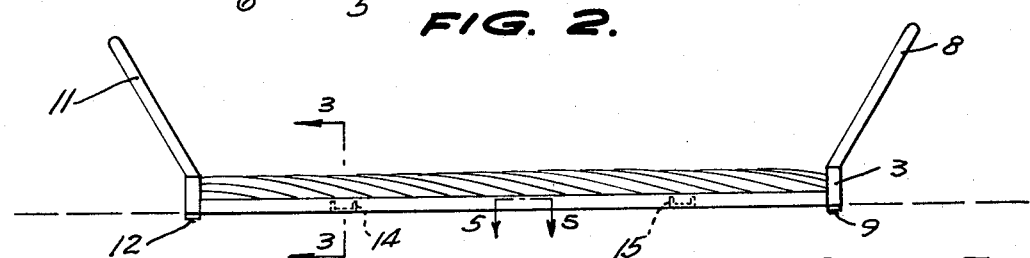
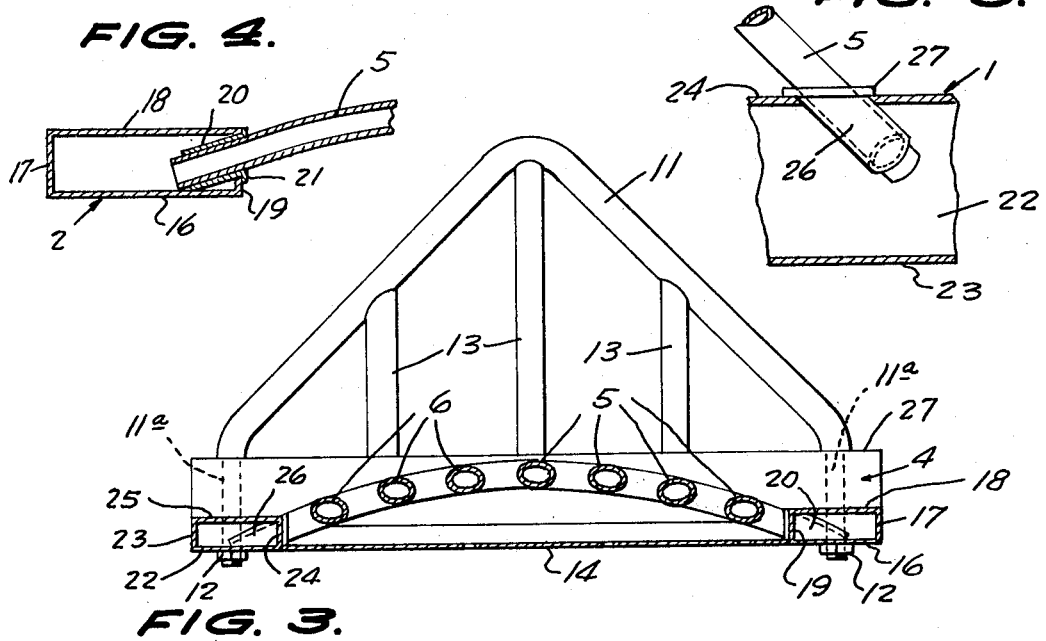
INVENTOR.
A. J. BRUNER,
BY Linton and Linton
ATTORNEYS.

3,384,352
ANIMAL CROSSING GUARD
A. J. Bruner, 2166 Katherine St.,
Fort Myers, Fla. 33901
Filed Aug. 11, 1966, Ser. No. 571,742
4 Claims. (Cl. 256—14)

ABSTRACT OF THE DISCLOSURE

The present animal crossing guard is for preventing clove-hoofed animals from crossing thereover after the guard has been placed across a path, roadway, railroad tracks or the like so the animals cannot stray thereover.

Summary of the invention

The present invention is concerned with an animal crossing guard including a frame having spaced apart sides and ends and tubular members each of which is arched longitudinally thereof with some of said tubular members extending diagonally between and connected to said sides and others of said tubular members extending diagonally between and connected to one of said sides and one of said ends whereby a clove-hoofed animal cannot walk over said tubular members.

The principal object of the present invention is to provide a guard to be placed across a path or roadway leading from pastures, woods or the like, or leading to other roads or railroad tracks and the like, which guard while permitting the travel of vehicles thereover will deter the walking of clove-hoofed animals such as cattle, horses, pigs and deer thereover preventing such animals from straying past said guard.

Another important object of the invention is to provide an animal crossing guard which prevents a plurality of rounded arched surfaces upon which a clove-hoofed animal cannot readily walk and which rounded surfaces extend diagonally to the passage of the animals or vehicles thereover so as not to provide a tread or series of lateral supports for the hoofs of animals and yet will provide a plurality of supports for the wheels of a vehicle travelling on said guard so that each tire would be on a plurality of said supports at a time permitting the supports to be of relatively small elements and yet capable of supporting the vehicle moving thereover.

Further objects of the invention will be in part obvious and in part pointed out in the following description of the accompanying drawings in which;

FIG. 1 is a top view of the present guard.

FIG. 2 is a side view of the guard.

FIG. 3 is an enlarged cross-sectional view taken on line 3—3 of FIG. 2.

FIG. 4 is a further enlarged cross-sectional view taken on line 4—4 of FIG. 1.

And FIG. 5 is a still further enlarged sectional view of a detail of the present device taken on line 5—5 of FIG. 2.

Referring now more particularly to the accompanying drawings, wherein like and corresponding parts are designated by similar reference characters, numeral 1 generally designates a straight frame side while 2 generally designates a similar straight frame side spaced from but substantially parallel to side 1. 3 generally designates a straight frame end, while 4 generally designates a similar straight frame end substantially parallel to but spaced from end 3. End 3 extends from sides 1 and 2 and is fixedly connected thereto by any conventional means, such as welding, rivets or the like. Likewise end 4 extends from side 1 to side 2 and is fixedly connected thereto by conventional means such as welding, rivets and the like. Thus sides 1 and 2 and ends 3 and 4 provide a rectangular frame.

A plurality of tubular elements 5 extend between sides 1 and 2 diagonally of said sides and have their end portions inserted within or fixedly connected to said sides as will be described more in detail hereinafter. Said tubular elements 5 are equally spaced apart with the distance between each adjacent pair of elements being approximately equal to the width of one tubular element. A further plurality of tubular elements 6 extend between and are inserted within or fixedly connected to side 1 and end 4. Said tubular elements 6 are of progressively smaller lengths and are spaced apart in the same manner as tubular elements 5. Likewise a plurality of tubular elements 7 extend between and are fixedly connected to or inserted in side 2 and end 3 and are of progressively smaller lengths. Said tubular elements 5, 6, and 7 are each arched longitudinally thereof in such a manner as to provide a crown or curved surface extending above the plane of the sides 1 and 2 as best indicated in FIG. 3. It is to be appreciated however, that said tubular elements 5, 6, and 7 by being turned through an arc of 90° from that shown in the drawings will extend downwardly below the sides 1 and 2 providing a concave surface between said sides.

A slip guard consisting of a V-shaped tubular member 8 and lateral tubular members 10 is mounted upon end 3 and diverges upwardly and outwardly therefrom. Said slip guard elements 8 and 10 can be fixedly connected to end 3 by welding or have bent threaded end portions 11a extending normal to and through end 3 and retained thereon by bolts 9. Similarly a second slip guard consisting of V-shaped tubular element 11 and tubular members 13 is fixedly mounted on end 4 by being welded thereto or may have threaded bent end portions 11a extending through end 4 and retained by bolts 12. Slip guard 11 diverges from end 4 upwardly and outwardly therefrom.

A pair of straight angle bars 14 and 15 extend between sides 1 and 2 and are fixedly connected thereto by conventional means such as welding or the like for the purpose of preventing said sides from spreading apart under a load on the tubular elements 5, 6, and 7.

Side 2 may be of a hollow rectangular cross-sectional configuration having a bottom 16, side 17, top 18 and inner side 19 with a series of equally spaced openings extending entirely along side 19. A plurality of tubes 20 having a flange 21 each are seated in one of the openings in side 19 as shown in FIG. 4. That is, flange 21 is seated against side 19 and tube 20 extends diagonally of side 19.

Similarly side 1 can be of a hollow rectangular cross-sectional configuration having a bottom 22, outer side 23, inner side 24 and top 25. Inner side 24 has a series of openings therein along the length of side 24 with these openings spaced apart similar to those in side 19. A plurality of tubes 26 each extend through one of said openings in side 24 diagonally thereof and have a flange 27 seated against the exterior of side 24 as shown in FIG. 5.

Tubular elements 5 each have one of their end portions inserted in a tube 20 or 26 in frictional engagement therewith for retaining said tubular elements 5 extending diagonally of sides 1 and 2 and with the curve of each tubular element being above or below the plane of sides 1 and 2.

Ends 3 and 4 are likewise each of a hollow rectangular cross-sectional configuration and have a series of equally spaced openings through their inner side with tubular elements (not shown) similar to elements 20–21 or 26–27 mounted in each end inner face as shown in FIGS. 4 and 5 and sides 1 and 2. Tubular elements 6 each have an end portion inserted in one of the tubes 26 of side 1 and its other end portion in a tube in end 4. Likewise tubular elements 7 each have an end portion inserted in one of the tubes 20 in side 2 and its other end portion inserted in the corresponding tube in the inner face of side 3. The openings in the frame sides and end inner faces are spaced apart in such a manner that the tubular elements 5, 6, and 7 are evenly spaced apart parallel to one another and diagonally of said sides and ends as shown in FIG. 1.

It is to be appreciated however, that the ends of the tubular elements 5, 6, and 7 can be welded to their respective side and end or said frame and said sides and ends can be solid or of other configurations than those shown. The elements 1–27 are preferably formed of metal.

In the use of the present guard the frame consisting of sides 1 and 2 and ends 3 and 4 are placed upon the ground or on a road with the tubular elements 5, 6, and 7 extending diagonally to the possible path which a cloved-hoofed animal might tend to use. That is, with sides 1 and 2 laterally of a path leading from the woods which may be used by deer or of a pasture for cattle and horses, or an opening in a pen for pigs or a road leading to railroad tracks or a lateral roadway or the like. Cloven-hoofed animals can not walk upon a rounded surface such as would be provided by the periphery of the tubular elements 5, 6, and 7 as well as the crown provided by all of said tubular elements so that the animal would be deterred from traversing said tubular elements. However, a vehicle could readily traverse the tubular elements and the wheels or tires thereof due to the diagonal position of the tubular elements would be supported by a plurality of four or five of said tubular elements at a time as the vehicle moves thereover so that said tubular elements could be of a smaller diameter and thinner material than, for example, if said tubular elements extended normal to sides 1 and 2. Also with said tubular elements extending diagonally to the path of travel of the animal they do not provide treads or parallel surfaces extending normal to ends 3 and 4 with the results that the cloven-hoofed animal would tend to slip on said tubular elements and therefore would be further deterred from attempting to cross the present guard. With the tubular elements being arched it is not necessary to have a drainage ditch under the present guard as is generally necessary with known types of cattle guards.

While tubular elements 5, 6, and 7 are referred to as tubes, they may be pipes or solid rods as found desirable.

The present device is capable of considerable modifications and such changes thereto as come within the scope of the appended claims is deemed to be a part thereof.

I claim:
1. A guard for preventing the passage of clove-hoofed animals thereover comprising a frame having a pair of spaced apart sides and a pair of spaced apart ends each connected to and extending between said pair of sides, a plurality of spaced apart tubular members, a portion of said tubular members extending diagonally between and being connected to one of said sides and one of said ends, others of said tubular members extending diagonally between and being connected to said pair of sides and each of said tubular members being arched longitudinally thereof.

2. A guard for preventing the passage of clove-hoofed animals thereover comprising a frame having a pair of parallel spaced apart straight sides and a pair of parallel spaced apart straight ends each connected to and extending between said pair of sides, said sides and ends each being of a hollow rectangular cross-sectional configuration and having a series of openings extending along and in one side thereof, a plurality of spaced apart tubular members extending diagonally of the sides of and connected to said frame, each of said tubular members being arched longitudinally thereof, a plurality of flanged tubes each being inserted in one of said openings with the flange thereof against the side having said opening and said tubular members each having end portions each being inserted in one of said flanged tubes.

3. A guard for preventing the passage of clove-hoofed animals thereover as claimed in claim 1 including a plurality of bars each fixedly connected at their ends of said pair of sides and extending therebetween to prevent the spreading apart of said sides from one another.

4. A guard for preventing the passage of clove-hoofed animals thereover as claimed in claim 1 including a pair of slip guards each fixedly mounted on and diverging from one of said ends.

References Cited
UNITED STATES PATENTS

| | | | |
|---|---|---|---|
| 594,148 | 11/1897 | Burnett | 256—17 |
| 2,535,795 | 12/1950 | Henningsen | 256—17 |
| 2,592,225 | 4/1952 | Winkler | 256—14 |
| 2,644,674 | 7/1953 | Thede | 256—14 |

FOREIGN PATENTS

| | | |
|---|---|---|
| 4,052 | 9/1926 | Australia. |

DAVID J. WILLIAMOWSKY, *Primary Examiner.*
DENNIS L. TAYLOR, *Examiner.*